No. 834,730. PATENTED OCT. 30, 1906.
C. M. JACKSON.
NUT LOCK.
APPLICATION FILED MAY 15, 1906.

Witnesses
Inventor
Charles M. Jackson

UNITED STATES PATENT OFFICE.

CHARLES M. JACKSON, OF PALMETTO, GEORGIA.

NUT-LOCK.

No. 834,730.  Specification of Letters Patent.  Patented Oct. 30, 1906.

Application filed May 15, 1906. Serial No. 316,944.

*To all whom it may concern:*

Be it known that I, CHARLES M. JACKSON, a citizen of the United States, residing at Palmetto, in the county of Campbell and State of Georgia, have invented certain new and useful Improvements in Nut-Locks, of which the following is a specification.

My invention relates to improvements in nut-locks particularly constructed for use in locking the nuts used upon railroad-rails, although the nut-lock may be used in any situation where it would perform its functions in an efficient and practical manner.

The main object of my invention is the provision of a nut-lock which can be produced at such a low figure as to make it commendable and desirable and which will positively lock the nut upon the bolt and prevent its turning when subjected to hard usage.

To attain the desired object, my invention consists of a nut-lock embodying novel features of construction and combination of parts substantially as disclosed herein.

Figure 1:
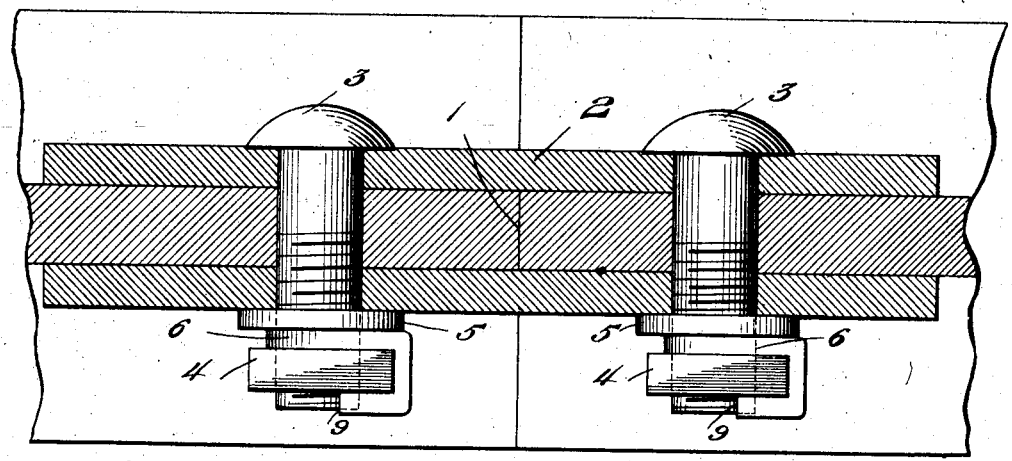
Figure 2:
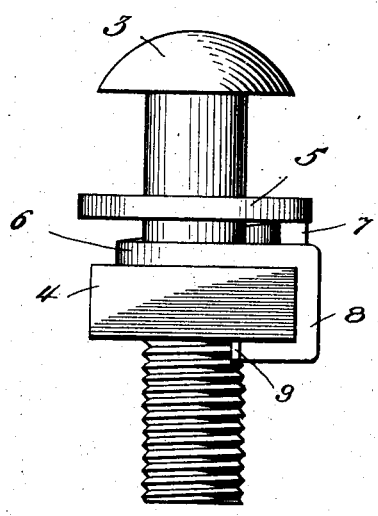
Figure 3:
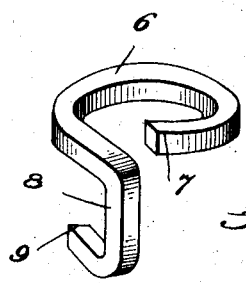

Figure 1 represents a horizontal sectional view through the web and fish-plates at the meeting ends of two rails with my nut-locks applied and shown in elevation. Fig. 2 represents an elevation, on an enlarged scale, of a nut and bolt with my nut-lock applied; and Fig. 3 represents a perspective view of the nut-lock detached.

In the drawings the numeral 1 designates the meeting ends of the rail, 2 designates the fish-plates, 3 designates the bolts, and 4 designates the nuts. Around the threaded ends of the bolts I place the flat washer 5, which is thus interposed between the fish-plates and the nuts, and between the washers and nuts I place my nut-locking device, which consists of the spring-metal ring 6, which has its terminal 7 offset to give a spring or elastic action to said ring and has its other terminal formed with an angular bend 8, the terminal arm of which has its sharp edge 9 adapted to bear against the thread of the bolt to effect in connection with the spring-ring the locking of the nut on the bolt.

In use the angular bend fits snugly upon the edge of the nut, with its terminal adjacent to the thread of the bolt, and when the nut is screwed home the spring action of the ring or band exerts an outward tension to retain the nuts in place, and when the spring-ring is forced to assume a flat position, as shown in Fig. 1, the outer end on the bend is forced into engagement with the thread of the bolt, and thus a double locking action is effected, and it is absolutely impossible for the nut to become unscrewed or to work loose.

It is evident that a nut-lock constructed in accordance with my invention can be used in conjunction with all nuts and bolts now in use upon railroads or elsewhere, that it will not in any manner injure the nuts or bolts, and that it is very durable and can be produced at a very small price and will positively secure the nut upon the bolts.

I claim—

1. A nut-lock comprising in combination, a bolt having a nut and washer thereon, a split spring-ring confined between the nut and washer and having an offset terminal to bite the washer, said ring being extended at an angle to engage the side of the nut, thence directed inwardly to engagement with the threads of the bolt.

2. The combination with a bolt having a washer and nut thereon, a split spring-washer having an angular terminal to engage the washer, the other terminal of the washer being extended at an angle to engage the side of the nut, thence directed inwardly substantially parallel to the split washer to engage the bolt.

3. The combination with a bolt and nut thereon, a split washer having an offset biting terminal and adapted to be compressed by the base of said nut, said washer having an integral extension to embrace the side of the nut, thence directed inwardly across the top of the nut for biting engagement with the bolt.

In testimony whereof I affix my signature in presence of two witnesses.

CHARLES M. JACKSON.

Witnesses:
 ED. B. WEAVER,
 R. B. DURRETT.